UNITED STATES PATENT OFFICE.

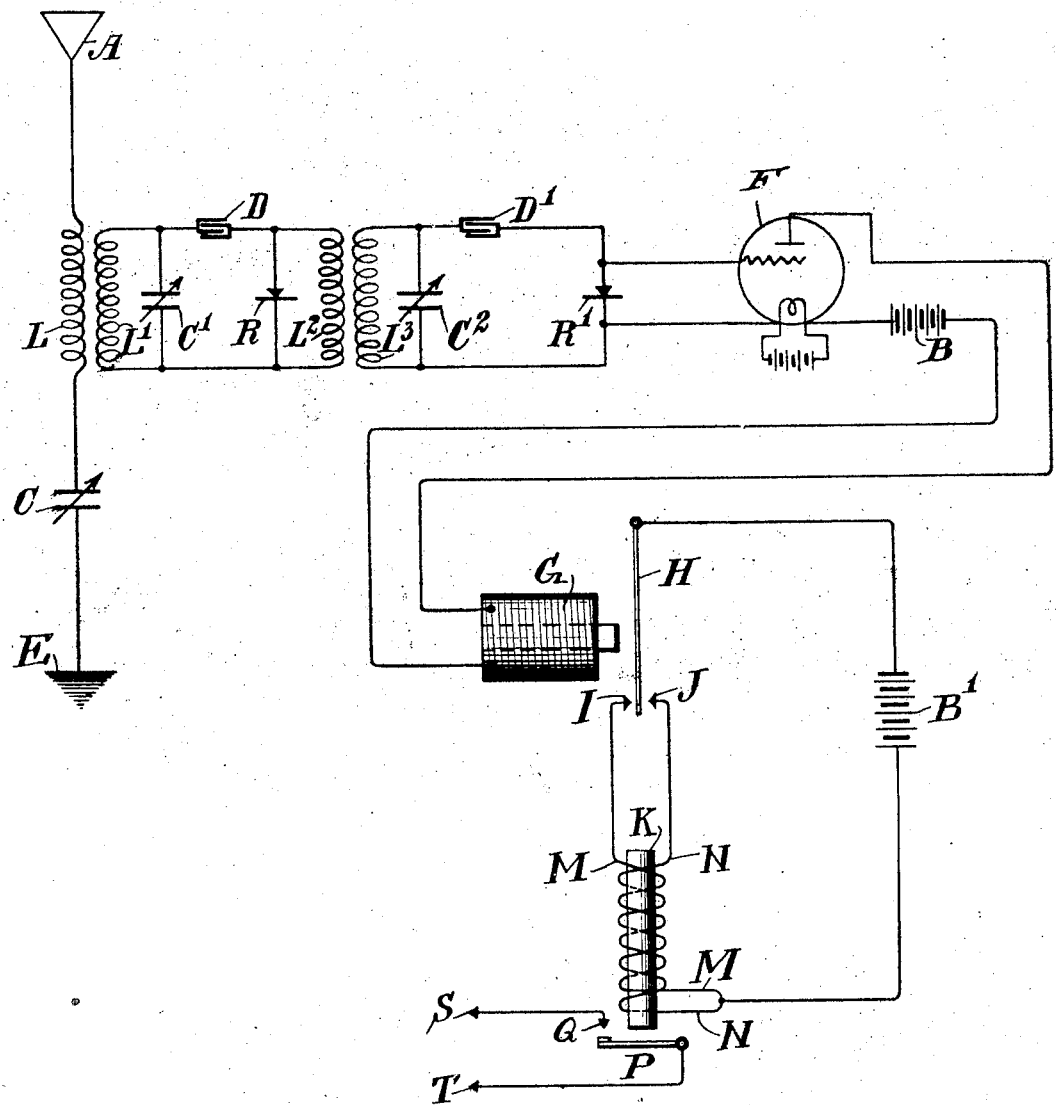

JOHN HAYS HAMMOND, JR., OF GLOUCESTER, MASSACHUSETTS.

RADIOSELECTIVE SYSTEM.

1,318,342.

Specification of Letters Patent. Patented Oct. 7, 1919.

Application filed February 5, 1913, Serial No. 746,287. Renewed October 23, 1918. Serial No. 259,456.

*To all whom it may concern:*

Be it known that I, JOHN HAYS HAMMOND, Jr., a citizen of the United States, residing at Gloucester, in the State of Massachusetts, have invented certain new and useful Improvements in Radioselective Systems, of which the following is a specification, reference being had to the accompanying drawing, forming a part hereof.

This invention relates to systems for the reception of radiant energy, and relates more particularly to the selective reception of electric wave signals and impulses, and to the prevention of interference with the receiving apparatus by transmitting stations using spark discharges, highly damped electric waves, and the like.

The accompanying drawing shows, in diagrammatic form, a receiving station on my system.

In the drawing, A is a receiving antenna, connected to earth at E through coil L and variable condenser C, the antenna circuit being tuned to a definite frequency, corresponding to that of the undamped high-frequency waves sent out from the transmitting station with which it is desired to be in touch. The oscillation circuit $L^1 C^1$, comprising the inductance coil $L^1$ and the variable condenser $C^1$, is tuned to this same frequency, and is coupled with the antenna circuit by means of the coil L and $L^1$. This oscillation circuit, by means of the stopping condenser D and rectifier R, supplies unidirectional current impulses to the coil $L^2$.

Oscillation circuit $L^3 C^2$, comprising inductance coil $L^3$ and variable condenser $C^2$, is tuned to the frequency of the periodic amplitude variations of the electric waves sent out by the transmitting station and is coupled to coil $L^2$ by means of coil $L^3$. This amplitude variation frequency should be higher than 20,000 per second, or at least so high that it will not cause the reed H, hereafter described, to vibrate. Oscillation circuit $L^3 C^2$, by means of the stopping condenser $D^1$ and the rectifier $R^1$, supplies current impulses to F, which is an apparatus for amplifying high-frequency oscillations, such as the system of amplification by means of a number of circuits in series having audion amplifiers. But F may also be any other suitable means for amplifying high-frequency oscillations. Neither this second oscillation circuit $L^3 C^2$, nor the amplifier F is essential to my invention, but may be employed as shown.

A battery B is in circuit with F and with the electromagnet G, and when undamped electric waves, in tune with the receiving circuits, are received, electromagnet G will be energized by practically continuous unidirectional current and will attract the vibratory reed or diaphragm H which is substantially aperiodic, or in other words which has no natural period of vibration within the range of the amplitude variation frequencies above mentioned. Reed H will then make connection with contact point I and will thus permit current to flow from battery $B^1$ through the coil M of electromagnet K. The electromagnet K will then be energized and will attract armature P, which will make connection with contact point Q, and so cause any suitable apparatus on the circuit S T to be operated.

If, however, spark discharges or highly-damped wave impulses of a frequency low as compared with the above mentioned amplitude variation frequencies are received on the antenna A and get through the receiving circuits as far as electromagnet G, they will cause current impulses to flow through the winding of G which will cause the reed H to vibrate and alternately strike contacts I and J. Electromagnet K has two windings, M and N, wound in opposite directions and connected, respectively, with the contacts I and J, so that when armature H vibrates and alternately makes connection with I and J, currents are sent alternately through windings M and N, which will counterbalance each other so that electromagnet K will not attract armature P, and the apparatus on circuit S T will not be operated.

In this way the apparatus, such as a steering gear, an engine control, or any other suitable apparatus, which it is desired to guard from outside interference, will be protected from systems and stations employing spark discharges, damped waves, and any undamped waves not in tune with the receiving circuits.

I may accomplish the neutralization or counterbalancing of my electromagnets and armatures in other ways, and in general, I do not confine myself to the particular apparatus and mechanisms here shown, but various changes and modifications, within the knowledge of those skilled in the art, may be made in the particular apparatus shown and described herein, without departing from the spirit of my invention, provided the means set forth in the following claims be employed.

Having thus described my invention, I claim:—

1. In a receiving station for radiant energy, a tuned receiving circuit, an electromagnet controlled by said receiving circuit, a vibratory element adapted to vibrate between two contacts when highly damped waves are received, a differentially-wound relay controlled by said element but which is not energized when said vibratory element vibrates, and an operative circuit controlled by said relay.

2. In a receiving station for radiant energy, a tuned receiving circuit, an electromagnet controlled by said receiving circuit, a vibratory element controlled by said electromagnet and adapted to vibrate between two contacts when energy due to spark discharges is received, a relay with differential windings each of which is connected with one of said contacts, an intermediate circuit comprising said vibratory element, said contacts, said windings and a battery, and an operative circuit controlled by said relay.

3. A receiving station for radiant energy, comprising a tuned receiving circuit, an electromagnet controlled by said receiving circuit, an operative circuit, a switch in said operative circuit, an intermediate circuit comprising a differentially-wound magnet controlling the switch in the operative circuit, and a vibratory element controlled by the receiving circuit so as to close a circuit through one of the windings of said electromagnet when the radiant energy is received continuously and to close a circuit alternately through the opposite windings of said electromagnet when energy is received non-continuously.

4. In a receiving device for radiant energy, a tuned receiving circuit, an electromagnet controlled by said receiving circuit, a vibratory element controlled by said electro-magnet and having a natural period of vibration, two stationary contacts arranged to be alternately engaged by said element, and an electro-magnetic device having opposed windings leading from said contacts respectively, and controlled by said vibratory element.

5. In a receiving device for radiant energy, a tuned receiving circuit, an electromagnet controlled by said receiving circuit, a vibratory element controlled by said electro-magnet and having a natural period of vibration, two stationary contacts arranged to be alternately engaged by said element, an electro-magnetic device having opposed windings leading from said contacts respectively, and controlled by said vibratory element, and an electric circuit including a source of energy controlled by said device.

This specification signed and witnessed this 11th day of January, A. D., 1913.

JOHN HAYS HAMMOND, Jr.

Signed in the presence of—

M. P. WINNE,
OLIVE B. KING.